United States Patent
Dörsam

(10) Patent No.: US 11,781,336 B2
(45) Date of Patent: Oct. 10, 2023

(54) IMPULSE DAMPER FOR TALL, NARROW STRUCTURES AND INSTALLATIONS

(71) Applicant: ESM Energie- und Schwingungstechnik Mitsch GmbH, Heppenheim (DE)

(72) Inventor: Mathias Dörsam, Birkenau (DE)

(73) Assignee: ESM ENERGIE—UND SCHWINGUNGSTECHNIK MITSCH GMBH, Heppenheim (DE)

(*) Notice: Subject to any disclaimer, the term of this patent is extended or adjusted under 35 U.S.C. 154(b) by 32 days.

(21) Appl. No.: 17/614,071

(22) PCT Filed: May 25, 2020

(86) PCT No.: PCT/EP2020/000102
§ 371 (c)(1),
(2) Date: Nov. 24, 2021

(87) PCT Pub. No.: WO2020/239248
PCT Pub. Date: Dec. 3, 2020

(65) Prior Publication Data
US 2022/0235572 A1    Jul. 28, 2022

(30) Foreign Application Priority Data
May 29, 2019   (EP) .................................... 19000263

(51) Int. Cl.
*E04H 9/02*    (2006.01)
*F03D 80/80*   (2016.01)
(Continued)

(52) U.S. Cl.
CPC .......... *E04H 9/0215* (2020.05); *F03D 80/88* (2016.05); *F03D 7/0296* (2013.01); *F05B 2260/964* (2013.01); *F16F 7/104* (2013.01)

(58) Field of Classification Search
CPC ....... E04H 9/0215; E04H 9/021; F03D 80/88; F03D 7/0296; F03D 13/20;
(Continued)

(56) References Cited

U.S. PATENT DOCUMENTS

| | | | |
|---|---|---|---|
| 9,657,717 B2 | 5/2017 | Ollgaard et al. | |
| 2010/0263167 A1 | 10/2010 | Fox | |
| 2016/0123303 A1* | 5/2016 | Ollgaard | E04H 12/00 52/173.1 |

FOREIGN PATENT DOCUMENTS

| | | |
|---|---|---|
| EP | 0 069 787 A1 | 1/1983 |
| EP | 2 746 483 A1 | 6/2014 |
| KR | 10-2013-0048636 A | 5/2013 |

OTHER PUBLICATIONS

International Search Report Corresponding to PCT/EP2020/000102 dated Oct. 6, 2020.
(Continued)

*Primary Examiner* — Aaron R Eastman
(74) *Attorney, Agent, or Firm* — Finch & Maloney PLLC

(57) ABSTRACT

A novel impulse damper for reducing extreme vibrational events, in particular, in tall, narrow structures such as wind turbines. The impulse damper, according to the invention, operates on the impact-damping principle and is particularly suitable for damping the second natural frequency of the installation, preferably of the tower of a wind turbine.

14 Claims, 2 Drawing Sheets

(51) Int. Cl.
*F03D 7/02* (2006.01)
*F16F 7/104* (2006.01)

(58) Field of Classification Search
CPC ..... F05B 2260/964; F16F 7/104; F16F 15/02;
F16F 15/04; F16F 15/28; Y02E 10/72;
E04B 1/98
See application file for complete search history.

(56) References Cited

OTHER PUBLICATIONS

Written Opinion Corresponding to PCT/EP2020/000102 dated Oct. 6, 2020.

* cited by examiner

US 11,781,336 B2

IMPULSE DAMPER FOR TALL, NARROW STRUCTURES AND INSTALLATIONS

This application is a national stage completion of PCT/EP2020/000102 filed May 25, 2019 which claims priority from European Patent Application No. 19000263.4 filed May 29, 2019.

FIELD OF THE INVENTION

The invention relates to a novel impulse damper for reducing, in particular, extreme vibrational events in tall, narrow structures, more particularly wind turbines. The impulse damper according to the invention operates on the impact-damping principle and is particularly suitable for damping the second natural frequency of the installation, preferably of the tower of a wind turbine. The impulse damper according to the invention is particularly characterized in that it is equipped, both on the damper side and on the installation side, with preferably resilient impact-damping elements that have a damping effect.

BACKGROUND OF THE INVENTION

Impact dampers or impulse dampers are known in principle in the prior art. In the event of vibrations through the main system, for example a wind turbine, the mass provided for the damping strikes a wall of the installation. An impulse occurs of which the direction is opposite to the direction of movement of the installation. This gradually calms the main system down.

A wind turbine comprising an impulse damper for damping the first tower natural frequency is described, for example, in U.S. Pat. No. 9,657,717 B2. The impulse damper is accommodated in the upper structure of the tower and comprises an independent damper housing which is fastened to said upper structure. The damper housing is cylindrical and is provided with a flat bottom. Inside the damper housing, there is a disk-shaped damper mass which is physically smaller than the surrounding housing and can be moved on the bottom of the housing via rollers. When the system moves, the damping disks strike the inside of the damping housing via damping elements and thus reduce the excitation vibration. As already mentioned, the described damper system is designed above all to act against vibrations of the first tower natural frequency which occurs in the top quarter to fifth of the tower or the narrow structure.

However, vibrations of the second tower natural frequency occur in the middle or at half to two thirds of the tower height. The solution proposed in the US patent would therefore be less suitable or not very effective for this application.

Due to its construction design, the impulse damper presented in this case is ideally suited for damping the second natural frequency of towers, in particular towers of wind turbines, or other tall, narrow structures or installations. The impulse damper according to the invention can preferably be used or become effective when the installations are affected by particular vibrational events which can occur in idle mode after switching off.

SUMMARY OF THE INVENTION

The invention therefore relates to an impulse damper (10) for reducing vibrations, in particular of the second natural frequency of towers or tall, narrow structures/installations, preferably wind turbines, substantially comprising:

a horizontally movable damper mass (6), a horizontally aligned support structure (4) on which the damper mass is movably mounted, wherein the support structure switch is firmly connected to the tower or the tall, narrow structure of the installation, so that the movements of the installation generated by the vibrational forces can be transferred to the damper mass that can be moved on the support structure, whereby, during the impacts of the moving damper mass against elements of the support structure or the installation, an impulse counter the direction of movement of the installation is generated and the vibration that occurs is damped, and additional damping elements that become effective when the damper mass comes into contact with the support structure or installation, wherein (i) the damper mass (6) is horizontally freely movable on the horizontally aligned support structure (4) via bearing elements (5) on the underside of the damper mass and is annularly surrounded with a first rotationally symmetrical impact device (3)(7) which is fastened to its lateral circumference and is effective in the horizontal direction (damper-side), and (ii) the support structure (4) is firmly connected to a second, rotationally symmetrical impact device (3')(7') which is effective in the horizontal direction and which annularly encloses the first opposite impact device (3)(7) and the damper mass (6) at a distance defined in the idle state.

The first (damper-side) impact device (3)(7) comprises a first fixed, inflexible/hard, horizontally aligned, annular impact disk (3) which, distributed over its circumference, has a plurality of first damping elements (7), for example elastomer elements, firmly connected thereto, or alternatively has a corresponding, single substantially continuously circumferential damping element (7).

The second installation-side (tower-side) impact device (3')(7') comprises a second fixed, inflexible/hard, horizontally aligned annular impact disk (3') which, distributed over its circumference, has a plurality of second damping elements (7'), for example elastomer elements, firmly connected thereto, or alternatively has a corresponding, single substantially continuously circumferential damping element (7').

The two impact devices (3)(7) and (3')(7') are arranged in relation to one another in such a way that, with any horizontal movement or deflection of the damper mass along the support structure (4), the impact disk (3) fastened thereto can strike, with its lateral outwardly pointing edge, against the opposite lateral edge of the impact disk (3') running further outwards in a circumferential manner, wherein the damping elements (7) and (7') become effective at the time of impact of the disks (3)(3') against each other.

The damping elements (7) of the first damper-side impact device are arranged between the impact disk (3), which is preferably located at the top, and the damper mass (6) and are each connected to these components. If the damper-side impact disk (3) comes into contact with the installation-side impact disk (3') on the support structure (4), the damping elements (7), which are firmly connected to the damper mass (6), depending on the type used, are actively or resiliently deformed.

In an analogous manner, the damping elements (7') of the second installation-side impact device are arranged between the annular impact disk (3'), which is preferably located at the top, and the support structure (4) and are each connected to these components. If the installation-side impact disk (3') comes into contact with the damper-side impact disk (3) on the damper mass (6), the damping elements (7'), which are firmly connected to the support structure (4), depending on the type used, are actively or resiliently deformed. This creates a restoring force. This also creates a restoring force.

In one embodiment of the invention, there are at least three, for example 3, 4, 6, 8, 10, 12, 20, 24, 30, 36 damping elements (7) and (7') arranged in a distributed manner on the circumference of the respective impact disks (3) and (3'), to which they are connected. The damping elements are preferably equipped with the same or similar damping properties, and their number and size depend on the size and the desired properties of the impulse damper according to the invention. The damping elements (7)(7') are preferably arranged uniformly on the circumference of each impact disk so that substantially the same stiffness and thus also substantially the same damping is present or is achieved in all directions of vibration of the installation or the mass (6).

In a further embodiment of the invention, the impact disks (3) and (3') each have only a single, substantially continuous damping element (7)(7'), so that even damping can be achieved in all directions.

According to the invention, the damping elements (7) and (7') can be of different types: for example, spring elements, hydraulic elements, elastomer elements, or friction elements can be used.

In a preferred embodiment of the invention, said damping elements are deformable, preferably round or conical elastomer elements, which can also be present as layer elements.

If the damping elements (7)/7') are deformable elastomer elements, it should be noted that the deformation of these resilient elements by the movement of the impulse damper mass (6) results in a significant and possibly undesirable heat development. For this reason, it can be advantageous to use a larger rather than a smaller number of smaller rather than larger individual resilient damping elements, since these have a larger total surface and thus contribute to better heat dissipation.

If this generated thermal energy is neglected or can be dissipated by other technical measures, it is also possible to design the individual resilient damping elements (7) and (7') each with a single, substantially continuously circumferential resilient element, which is firmly connected to each annular impact disk (3)(3').

In the simplest case, the support structure (4) is a plate mounted horizontally to the tower/building or has such a plate and is directly or indirectly firmly connected to the tower or the building via supports or brackets (2).

The damping mass (6) bears against the support structure (4) via the bearing elements (5). According to the invention, the bearing elements can be sliding friction bearings/sliding layers or else elastomer shear elements. When the frictional forces of the sliding bearing/sliding layer are overcome, the damping mass (6) can (5) can therefore move on the support structure (4) in accordance with the acting vibrational forces. The friction of the bearings (5) can be selected so that the damping mass (6) can only start moving when a specific force is applied. During normal operation of the installation, it is usually desired that no or no significant movement of the damping mass (6) and thus no damping is initiated. The friction and sliding elements have a coefficient of friction that is designed in accordance with the properties and the operating conditions of the installation so that sufficient energy dissipation can take place through friction from the vibrating installation. It must be ensured that a specific amount of energy is dissipated per vibration cycle. This dissipated energy is made up of the friction work on the bearing (5) and the damping work within the damping elements (7)(7') of the impact devices (3)(7) and (3')(7'). If the coefficient of friction on the bearing (5) is increased, less energy has to be dissipated on the damping elements (7)(7'). As a result, in the case of resilient elements, an elastomer with less damping can be used, which has advantages in terms of overheating and the stiffness behavior of the (7) above the temperature, since elastomers with high damping change their properties strongly above the temperature.

In addition to the said friction or sliding bearings, in another embodiment of the invention, elastomer shear springs can also be used, which allow a frictionless horizontal movement of the damper mass (6). If the shear stiffness of the elastomer shear spring is low, the impact damper is effective even with a very small external excitation. A restoring component that can be used to adjust the natural frequency of the damper mass is generated by the elastomer shear springs so that it functions as a damper with or without an impact function. This can significantly increase the performance of the damper. In this case, however, the natural frequency of the absorber unit must be adapted to the natural frequency of the main system. With the impact function, the shear stiffness of the elastomer shear spring and the stiffness of the spring-damper unit (7)(7') must be matched to the excitation that occurs from the main system so that the mass always strikes in phase opposition to the vibration from the main system. This configuration has the advantage of good performance.

The impact- or impulse damper (10) according to the invention is provided to be installed in the central or middle region of the building height so that the second natural frequency of the structure can be influenced rather than the first natural frequency that occurs in the upper region or at the top of the structure. The structure is preferably a tower of a wind turbine.

For this purpose, the support structure (4) with the actual impulse damper is firmly connected to the tower wall (1) at the corresponding height of 40-80%, preferably 50-70%, in particular 55-60% of the tower or building height. In the case of a wind turbine, this is preferably done on a tower flange (2) which connects the various tower segments to one another.

The mode of operation of a damping arrangement according to the invention with a friction/sliding bearing arrangement is as follows:

In the case of slight vibrations caused by movements of the installation and, in the case of a wind turbine, by movements of the tower, the damper mass (6) does not move relative to the support structure (4) if the frictional forces are greater than the vibrational forces.

Friction-sliding linings (5) are fastened to the underside of the damper mass (6). These friction-sliding linings (5) rest against the support structure (4). In the case of small vibrations from the main system (e.g. wind turbine), there is no relative movement between the friction-sliding linings (5) and the support structure (4).

If the vibrations from the main system become greater, there is also a greater acceleration force on the damper mass (6). If this acceleration force is greater than the frictional force between the friction-sliding linings (5) and the support structure (4), there is a relative movement between the damper mass (6) and the support structure (4).

This relationship can be captured with the following equation:

$$XH = \frac{\mu * g}{(2 * \pi * fH)^2}$$

X_H → vibration amplitude of the main system, starting from which the relative movement between the damper mass (6) and the base plate (4) occurs (system starts to work)

μ → coefficient of friction between the friction-sliding linings (5) and the support structure g → gravity f_H → main system vibration frequency (main system resonance frequency)

The direction of movement of the damper mass (6) is, in this case, counter the movement of the main system (if the main system swings to the left, the damper mass moves to the right and vice versa).

It can be seen that, in the case of a smaller μ (sliding lining), the damper mass starts moving (starts to be effective earlier) with a smaller vibration amplitude from the main system. If μ is chosen to be large (friction lining), the system only starts to be effective at large amplitudes. This allows the damper to be adapted to each application. This can also save costs, since the impulse damper does not start to move in the event of small vibrations in the installation and therefore does not experience any wear.

In addition, a higher coefficient of friction allows the impact load to be reduced when the impact disks (3)(3') come into contact, as this brakes the damper mass (6) all the way up to the impact and thus reduces the energy which has to be absorbed by the damping elements (7)(7'). By appropriately coordinating and adapting the coefficient of friction by selecting appropriate materials, the impact load in the impulse damper according to the invention can thus be modified in a targeted manner, i.e. it can also be reduced.

In a calculation example with a 5 t damper mass, the impact load can be reduced by 20% by increasing the coefficient of friction from μ=0.05 (sliding lining) to μ=0.45 (friction lining).

Since the damping elements according to the invention are connected to one another both on the damper side (7) and on the installation side (7'), the impact load is evenly distributed on all connected elements, in contrast to the solutions of the prior art.

If the vibration amplitude of the main system is large enough, the impact disks (3)(3') strike against one another. As a result, an impulse is generated by the main system counter the direction of movement, thereby minimizing its vibration.

The effect of the damping elements (7')(7) is designed in such a way that substantially the same behavior is present in all horizontal directions. This unit can be built up in the following configurations:
- only springs
- only dampers
- individual spring and damper in parallel connection
- individual spring and damper in series connection
- consist of an elastomer, which behaves in a first approximation like a spring-damper arrangement in parallel connection.

As already mentioned, the damping elements (7) according to the invention are preferably arranged in a rotationally symmetrical manner and connect the damper mass (6) to the impact disk (3) on the mass side. The damping elements (7') are also arranged in a rotationally symmetrical manner and connect the supporting structure (4) to the impact disk (3') on the installation side. As a result, the structure-borne noise from the impact event is effectively minimized in the damper mass (6) and in the tower (1), which results in a significantly reduced noise pollution during damper operation. Given the currently very strict noise restrictions for wind turbines, this represents a clear advantage over the prior art.

In order to further reduce the noise pollution, the damping elements (7) are preferably designed to be soft, so that a large deformation results during the impact (maximum deformation in the range of +/+150 mm; operational deformation in the range of +/−40 to 100 mm). This minimizes the first peak of the impact load, which also significantly reduces noise pollution. The impact event is cushioned, so to speak.

The soft damping elements on both sides of the impact devices also significantly reduce the impact load on both the installation-side and the damper-side structure, since only the annular, inflexible impact disks (3)(3') are braked abruptly during the impact. The load on the components behind is less, however, since the impact elements deform and thus reduce the acceleration of the remaining components.

In contrast to comparable systems of the prior art, the structural design described means that a damper housing can be dispensed with. Since no damper housing is required, there is also a cost advantage. Instead, the path limitation is integrated into the required supporting structure.

The shape of the damper mass (6) of the impulse damper according to the invention can be freely selected as long as it is rotationally symmetrical. Since the shape of the damper mass can now be freely selected, it can now be integrated much more easily into the limited installation space within the wind turbine. A round shape of the damper mass (6) is preferably selected.

If a plurality of separate damping elements (7)(7') are used, the load per element is reduced. This is an advantage, for example compared to the system described in U.S. Pat. No. 9,657,717 B2, in which system the complete impact load has to be absorbed by a single point on the damping element. In the case of the impulse damper according to the invention with a plurality of individual damping elements, on the other hand, the impact load is distributed over their number. In contrast to this, the solution in U.S. Pat. No. 9,657,717 B2, for example, does not result in a distribution of the impact load over a plurality of elements, since the impact always only takes place at one point and thus acts against an individual damping element on the circumference.

DETAIL DESCRIPTION OF THE PREFERRED EMBODIMENT(S)

Figure 1:
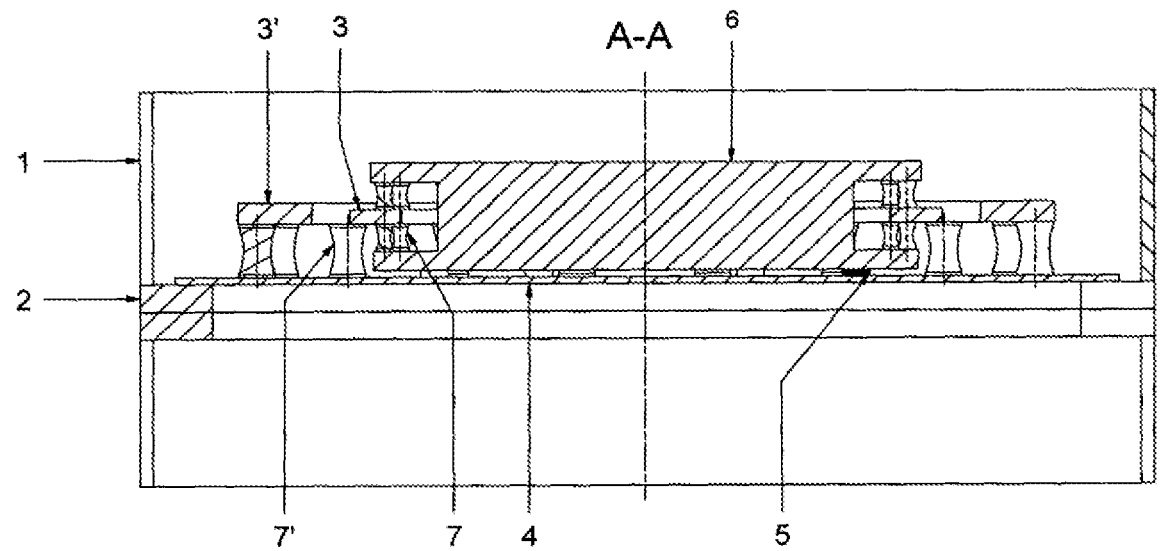
FIG. 1 is a schematic side view of the design of the impulse damper (10) according to the invention.

The round damper mass (6) is mounted by usually a plurality of bearing elements (5) on a horizontally aligned plate-shaped support structure (4), which bearing elements are connected to the tower wall (1) via support brackets (2).

In this embodiment, the bearing elements are friction or sliding bearings with a coefficient of friction that corresponds to the desired requirements. The damper mass can move freely in all directions according to the friction values of the bearings (5) on the plate, provided that the necessary forces, generated by the movement of the installation, occur. The mass (6) is freely movable horizontally.

The mass (6) has, on its lateral circumference, an annular, rotationally symmetrical first impact device (3)(7) of the impulse damper, which is substantially formed by resilient damping elements (7) and hard, non-resilient impact elements (3).

In this embodiment, the damping elements (7) are represented by a multiplicity of elastomer elements which are attached in an evenly distributed manner around the mass.

The impact device (3)(7) is connected to the mass by a bracket.

In the embodiment shown, the mass (6) has a circumferential recess on the side, which serves as a bracket. In this recess, cylindrical or conical elastomer elements (7) are preferably firmly attached to their outwardly pointing end to the upper and also to the lower part of the recess. Said elastomer elements (7) are firmly connected, with the end pointing inwards, to the likewise circumferential impact disk (3), which is thus arranged centrally in the recess or bracket. However, the design can also deviate from the one specifically described herein, as long as the functionality is maintained.

The impact disk (3) protrudes over the edge of the recess. Instead of the recess in the damper mass (6), a correspondingly designed circumferential bracket for the impact device (3)(7) can also be provided.

In the specific case, the impact device (3)(7) comprises cylindrical elastomer elements which are preferably symmetrically opposite each other and are separated from one another by the impact disk (3) to which they are firmly connected. The mass can now move horizontally in all directions according to the acting forces until the impact disk (3) strikes the opposite impact disk (3').

The impulse damper according to the invention also has an annular, rotationally symmetrical second impact device (3')(7'). An annular impact disk (3') is connected to the support structure (4) and via the support brackets (2) to the installation to be damped, in this case the wall (1) of a tower.

The annular impact disk (3') is aligned horizontally to the support structure (4) and is arranged opposite the impact disk (3) of the mass part (6) in such a way that the side edges of the disks (3') and (3) face each other. The impact ring (3') is connected on its underside to preferably cylindrical or conical elastomer elements (7') at their upper end, which preferably correspond in number and arrangement to the opposite elastomer elements (7) on the damper mass (6). The elastomer elements (7') are firmly connected at their lower end to the support structure (4). When the impulse damper is in the idle state, the disks (3')(3) have a defined distance, the value of which depends on the size of the damper and its desired damping properties. When force is applied, the disks (3') and (3) strike against one another at their side edges due to the movement of the mass (6) on the horizontal surface of the support plate (4). The movement space between the impact elements (3) and (3') can be selected according to the desired conditions, but in the case of a wind turbine is approximately 5 mm-200 mm, preferably 20 mm-100 mm.

Figure 2:
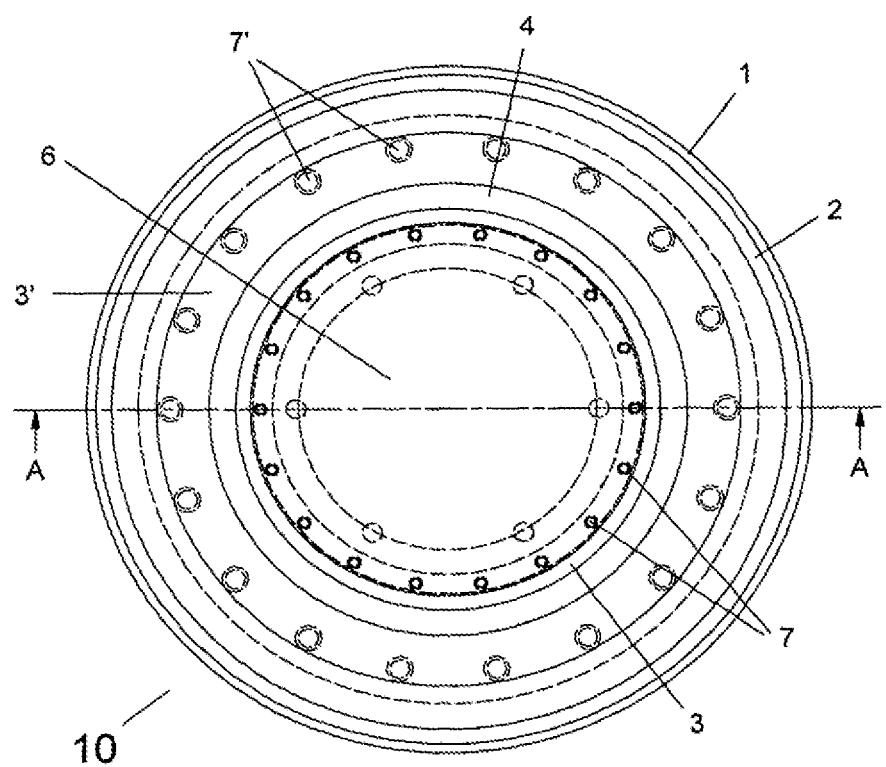
FIG. 2 shows a corresponding top view of the impulse damper according to the invention in accordance with FIG. 1.

FIG. 2 shows a corresponding top view of the impulse damper according to the invention in accordance with FIG. 1.

Figure 3:
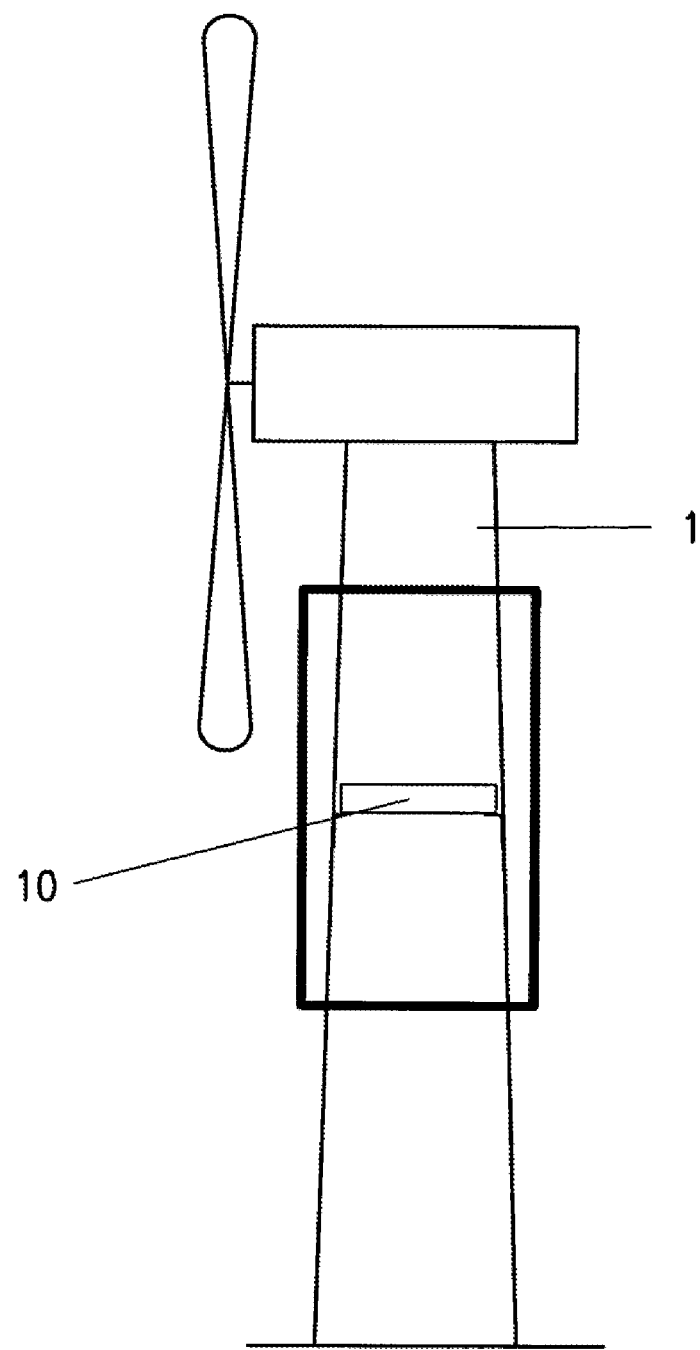
FIG. 3 schematically shows a wind turbine with tower, nacelle, and rotor.

FIG. 3 schematically shows a wind turbine with tower, nacelle, and rotor.

The impulse damper (10) according to the invention is also shown schematically. The rectangular frame indicates the range of the possible position of the impulse steamer according to the invention in relation to the tower height, in which the second natural frequency of the installation can be effectively damped.

The invention claimed is:

1. An impulse damper suitable for damping vibration that occurs in an installation for a tower or in other tall, narrow structure,
wherein the impulse damper is attached within the tower or the tall, narrow structure, and the impulse damper comprises:
(a) a horizontally movable damper mass,
(b) a horizontally aligned support structure for the damper mass, which is firmly connected to the installation of the tower or the tall, narrow structure so that movement of the installation, generated by vibrational forces, are transferred to the damper mass that are movable on the support structure, whereby, during impact of the moving damper mass, against elements of the support structure or the installation, an impulse, which is counter to a direction of movement of the installation, is generated so that vibration that occurs is damped, and
(c) additional damping elements that become effective when the damper mass comes into contact with the support structure or the installation,
wherein
(i) the damper mass (6) is freely movable horizontally on the horizontally aligned support structure (4), via bearing elements (5) on an underside of the damper mass, and is annularly surrounded with a first rotationally symmetrical impact device (3, 7) which is fastened to a lateral circumference of the damper mass and is effective in a horizontal direction, and
(ii) the support structure (4) is connected to a second, rotationally symmetrical impact device (3', 7') which is effective in the horizontal direction and which annularly encloses the first opposite impact device (3, 7) and the damper mass (6) at a distance defined in an idle state,
wherein the first impact device (3, 7) comprises a first inflexible, horizontally aligned annular impact disk (3), which is distributed over a circumference thereof, and a plurality of individual first damping elements (7) firmly connected thereto, or a single annular first damping element (7) which is substantially continuous along the circumference of the first impact disk (3), and the second impact device (3', 7') comprises a second inflexible, horizontally aligned annular impact disk (3'), which is distributed over a circumference thereof, and a plurality of individual second damping elements (7') firmly connected thereto, or a single annular second damping element (7) which is substantially continuous along the circumference of the second impact disk (3'), and the first and the second impact devices (3, 7; 3', 7') are arranged, in relation to one another, in such a way that, with any horizontal movement or deflection of the damper mass (6) along the support structure (4), the first impact disk (3) fastened to the damper mass can strike, with a lateral outwardly pointing edge thereof, against an opposite lateral edge of the second impact disk (3') running further outwards in a circumferential manner with simultaneous deformation or activation of the plurality of or single first and the second damping elements (7, 7').

2. The impulse damper according to claim 1, wherein the bearing elements (5), between the damper mass (6) and the support structure (4), are friction or sliding elements.

3. The impulse damper according to claim 2, wherein the friction and sliding elements (5) have a coefficient of friction which is designed, according to properties and operating conditions of the installation, so that sufficient energy dissipation occurs through friction from the vibrating installation.

4. The impulse damper according to claim 3, wherein the coefficient of friction of the sliding elements (5) is selected so that the damper mass (6) stands still during normal operation and only starts moving upon the occurrence of relatively larger vibration amplitudes.

5. The impulse damper according to claim 1, wherein the bearing elements (5), between the damper mass (6) and the support structure (4), are frictionless, resilient shear elements.

6. The impulse damper according to claim 1, wherein the first damping elements (7) or the single first damping element (7) are/is connected to the damper mass (6) and to the first impact disk (3).

7. The impulse damper according to claim 1, wherein the second damping elements (7') or the single second damping element (7') are/is connected to the support structure (4) and to the second impact disk (3').

8. The impulse damper according to claim 1, wherein the first and the second damping elements (7, 7') are one of spring elements, elastomer elements, friction elements, or hydraulic elements.

9. The impulse damper according to claim 1, wherein the first impact device (3, 7) has at least three individual first damping elements (7) and the second impact device (3', 7') has at least three second damping elements (7'), each of the first and the second damping elements (7, 7') is distributed along a circumference of each of the first and the second annular impact disks (3, 3'), respectively, such that a same stiffness and damping is present in all possible directions of vibration of the mass (6), and the first and the second damping elements having substantially the same damping properties.

10. The impulse damper according to claim 9, wherein the first damping elements (7) are each arranged opposite the second damping elements (7').

11. The impulse damper according to claim 9, wherein the first and the second damping elements (7, 7') are at least one of deformable, cylindrical, or conical elastomer elements.

12. Use of an impulse damper according to claim 1 for damping vibrations of a second natural frequency of the installation to be damped or of the tall, narrow structure.

13. A tower or narrow, tall building comprising the impulse damper according to claim 1.

14. A wind turbine comprising a tower, a nacelle, and a rotor blade system having a drive, according to claim 1, wherein the impulse damper is attached in the tower at a height of 40-80% of a total height of the tower.

* * * * *